(12) United States Patent
Chang et al.

(10) Patent No.: US 10,148,867 B2
(45) Date of Patent: Dec. 4, 2018

(54) CAMERA AUTO-FOCUS APPARATUS FOR PERFORMING LENS POSITION COMPENSATION TO DETERMINE FOCUSED LENS POSITION AND RELATED CAMERA AUTO-FOCUS METHOD

(71) Applicant: MEDIATEK INC., Hsin-Chu (TW)

(72) Inventors: Tun-Chieh Chang, New Taipei (TW); Hung-Jen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/635,221

(22) Filed: Jun. 28, 2017

(65) Prior Publication Data

US 2017/0295315 A1    Oct. 12, 2017

Related U.S. Application Data

(63) Continuation of application No. 14/813,135, filed on Jul. 30, 2015, now Pat. No. 9,729,776.

(60) Provisional application No. 62/042,308, filed on Aug. 27, 2014.

(51) Int. Cl.
| | |
|---|---|
| *H04N 5/232* | (2006.01) |
| *G03B 13/36* | (2006.01) |
| *G02B 7/10* | (2006.01) |
| *G02B 7/38* | (2006.01) |

(52) U.S. Cl.
CPC ......... *H04N 5/23212* (2013.01); *G02B 7/102* (2013.01); *G02B 7/38* (2013.01); *G03B 13/36* (2013.01); *H04N 5/23293* (2013.01); *H04N 5/23296* (2013.01)

(58) Field of Classification Search
CPC .......... H04N 5/23212; H04N 5/23296; H04N 5/23293; G02B 7/102; G02B 7/38
See application file for complete search history.

(56) References Cited

U.S. PATENT DOCUMENTS

| | | |
|---|---|---|
| 2007/0047942 A1 | 3/2007 | Chang |
| 2008/0124068 A1 | 5/2008 | Kwon |
| 2010/0315542 A1 | 12/2010 | Yoshino |
| 2011/0058093 A1 | 3/2011 | Kim |
| 2013/0329106 A1 | 12/2013 | Bigioi |
| 2014/0368724 A1 | 12/2014 | Zhang |
| 2016/0014404 A1 | 1/2016 | Krestyannikov |
| 2016/0266467 A1 | 9/2016 | Lou |

FOREIGN PATENT DOCUMENTS

| | | |
|---|---|---|
| KR | 1020110071552 A | 6/2011 |
| WO | 2006049039 A1 | 5/2006 |

*Primary Examiner* — Shahbaz Nazrul
(74) *Attorney, Agent, or Firm* — Winston Hsu

(57) ABSTRACT

A camera auto-focus apparatus includes a lens scan control circuit, a lens position compensation circuit, and a lens position decision circuit. During an auto-focus procedure, the lens scan control circuit controls movement of a lens according to a plurality of lens positions, and obtains a plurality of focus values corresponding to the lens positions respectively. The lens position compensation circuit determines a position compensation value according to the movement of the lens. The lens position decision circuit determines a focused lens position according to the position compensation value, the lens positions and the focus values.

3 Claims, 8 Drawing Sheets

CAMERA AUTO-FOCUS APPARATUS FOR PERFORMING LENS POSITION COMPENSATION TO DETERMINE FOCUSED LENS POSITION AND RELATED CAMERA AUTO-FOCUS METHOD

CROSS REFERENCE TO RELATED APPLICATION

This is a continuation of the co-pending U.S. application Ser. No. 14/813,135 (filed on Jul. 30, 2015), which claims the benefit of U.S. provisional application No. 62/042,308 (filed on Aug. 27, 2014). The entire content of the related applications is incorporated herein by reference.

BACKGROUND

The disclosed embodiments of the present invention relate to a camera auto-focus technique, and more particularly, to a camera auto-focus apparatus for performing a lens position compensation to determine a focused lens position and a related camera auto-focus method.

Recently, camera systems are widely used in a variety of applications such as mobile phones and tablets. The mobile phone market is continuing to increase explosively, especially with integration of high-end camera functions. Conventional camera phones have used manual focusing techniques in which users would adjust the location of lens with their own hands for producing a focused image. However, user's skill will limit the image quality since it is hard to focus on the target object precisely. Therefore, phone manufacturers are developing camera phones with auto-focus (AF) function to enhance the image quality. The AF function can solve above-mentioned problems and provide users with high quality images as well as ease of using the camera phones.

Nowadays, phone manufacturers require a camera auto-focus apparatus with a more compact volume and a lower production cost. Accordingly, a VCM (Voice Coil Motor) type lens module is commonly used. With regard to the VCM type lens module, it includes a lens and a VCM actuator, where the VCM actuator is used to control a position of the lens through pushing/pulling a spring mechanism. In general, the focus value is biased at a moving frame that is captured when the lens is still moving due to damping of the spring mechanism. Further, the spring mechanism has different damping responses for opposite lens scan directions, including a lens scan direction from an infinite side to a macro side and a lens scan direction from a macro side to an infinite side. Hence, a focused lens position found in one lens scan direction does not coincide with a focused lens position found in the other lens scan direction, which results in auto-focus inconsistency. The auto-focus inconsistency issue caused by damping of the spring mechanism can be avoided when the focus values are obtained after the lens become stable. However, such an auto-focus design will result in degradation of the auto-focus speed.

Thus, there is a need for an innovative camera auto-focus design which is capable of solving the auto-focus inconsistency issue without degradation of the auto-focus speed.

SUMMARY

In accordance with exemplary embodiments of the present invention, a camera auto-focus apparatus for performing a lens position compensation to determine a focused lens position and a related camera auto-focus method are proposed to solve the above-mentioned problem.

According a first aspect of the present invention, an exemplary camera auto-focus apparatus is disclosed. The exemplary camera auto-focus apparatus includes a lens scan control circuit, a lens position compensation circuit, and a lens position decision circuit. The lens scan control circuit is arranged to control movement of a lens according to a plurality of lens positions during an auto-focus procedure, and obtain a plurality of focus values corresponding to the lens positions respectively. The lens position compensation circuit is arranged to determine a position compensation value according to the movement of the lens. The lens position decision circuit is arranged to determine a focused lens position according to the position compensation value, the lens positions and the focus values.

According to a second aspect of the present invention, an exemplary camera auto-focus apparatus is disclosed. The exemplary camera auto-focus apparatus includes a lens scan control circuit and a lens position decision circuit. During an auto-focus procedure, the lens scan control circuit is arranged to control movement of a lens according to a plurality of first lens positions in a first lens scan direction, and further arranged to control the movement of the lens according to a plurality of second lens positions in a second lens scan direction and obtain a plurality of focus values corresponding to the second lens positions respectively when a focused lens position is not found in the first lens scan direction, wherein the second lens scan direction is opposite to the first lens scan direction, and a step size of the movement of the lens in the first lens scan direction is equal to a step size of the movement of the lens in the second lens scan direction. The lens position decision circuit is arranged to determine a focused lens position according to at least the second lens positions and the focus values.

According to a third aspect of the present invention, an exemplary camera auto-focus method is disclosed. The exemplary camera auto-focus method includes: controlling movement of a lens according to a plurality of lens positions during an auto-focus procedure, and obtaining a plurality of focus values corresponding to the lens positions respectively; determining a position compensation value according to the movement of the lens; and determining a focused lens position according to the position compensation value, the lens positions and the focus values.

According to a fourth aspect of the present invention, an exemplary camera auto-focus method is disclosed. The exemplary camera auto-focus method includes: during an auto-focus procedure, controlling movement of a lens according to a plurality of first lens positions in a first lens scan direction, and when a focused lens position is not found in the first lens scan direction, controlling the movement of the lens according to a plurality of second lens positions in a second lens scan direction and obtain a plurality of focus values corresponding to the second lens positions respectively, wherein the second lens scan direction is opposite to the first lens scan direction, and a step size of the movement of the lens in the first lens scan direction is equal to a step size of the movement of the lens in the second lens scan direction; and determining a focused lens position according to at least the second lens positions and the focus values.

According to a fifth aspect of the present invention, an exemplary camera auto-focus method is disclosed. The exemplary camera auto-focus method includes: controlling movement of a lens in a first lens scan direction, wherein an image content included in an auto-focus frame displayed on a user interface has a zoom-in rate; and controlling movement of the lens in a second lens scan direction opposite to the first lens scan direction, wherein the image content included in the auto-focus frame displayed on the user interface has a zoom-out rate equal to the zoom-in rate.

These and other objectives of the present invention will no doubt become obvious to those of ordinary skill in the art after reading the following detailed description of the preferred embodiment that is illustrated in the various figures and drawings.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
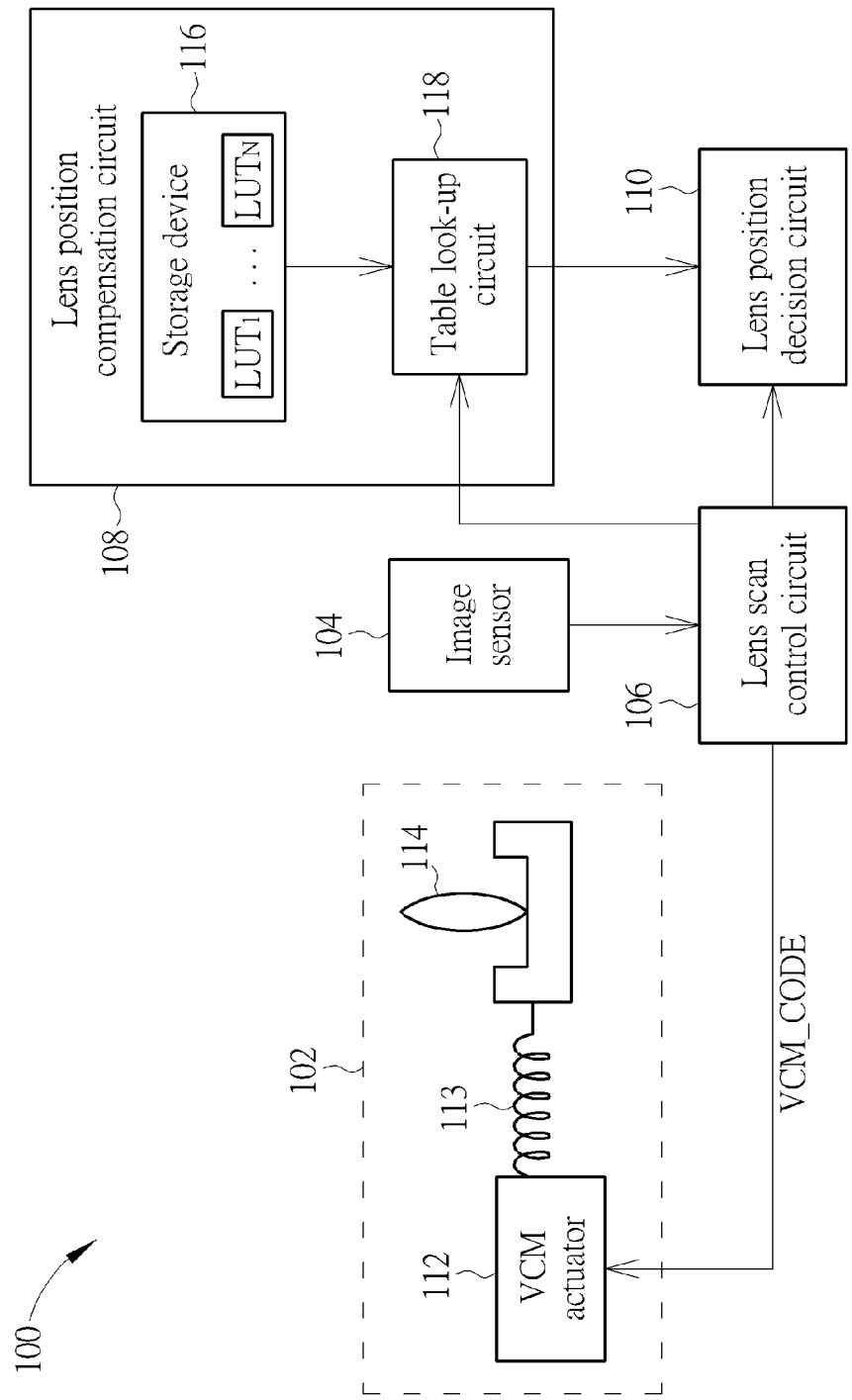
FIG. 1 is a block diagram illustrating a camera auto-focus apparatus according to an embodiment of the present invention.

FIG. 1 is a block diagram illustrating a camera auto-focus apparatus according to an embodiment of the present invention. The camera auto-focus apparatus 100 may be part of a camera system used in an electronic device, such as a mobile phone or a tablet. In this embodiment, the camera auto-focus apparatus 100 includes a VCM type lens module 102, an image sensor 104, a lens scan control circuit 106, a lens position compensation circuit 108, and a lens position decision circuit 110. The VCM type lens module 102 includes a VCM actuator 112, a spring mechanism 113, and a lens 114. The lens position compensation circuit 108 includes a storage device 116 and a table look-up circuit 118, where the storage device 116 may be a non-volatile memory such as a flash memory.

For example, the lens scan control circuit 106, the table look-up circuit 118 and the lens position decision circuit 110 may be implemented in an image signal processor (ISP). For another example, the lens scan control circuit 106, the table look-up circuit 118 and the lens position decision circuit 110 may be implemented in an application processor (AP). To put it simply, any camera system using the proposed camera auto-focus apparatus 100 falls within the scope of the present invention.

The lens scan control circuit 106 is coupled to the image sensor 104 and the VCM actuator 112. The lens scan control circuit 106 is arranged to output a VCM driver code VCM_CODE to the VCM actuator 112 for instructing the VCM actuator 112 to move the lens 114 to a desired lens position corresponding to the VCM driver code VCM_CODE. Specifically, during an auto-focus procedure, the lens scan control circuit 106 is arranged to control movement of the lens 114 according to a plurality of lens positions, and obtain a plurality of focus values corresponding to the lens positions respectively, where each of the focus values may be an image contrast value calculated by analyzing a frame captured by the image sensor 104 in response to one VCM driver code VCM_CODE issued from the lens scan control circuit 106. To ensure the auto-focus speed, each of the focus values is derived from analyzing a moving frame that is captured by the image sensor 104 when the lens 114 is still moving due to damping of a spring mechanism 113 driven by the VCM actuator 112 (i.e., when the lens 114 is not stable yet).

Figure 2:
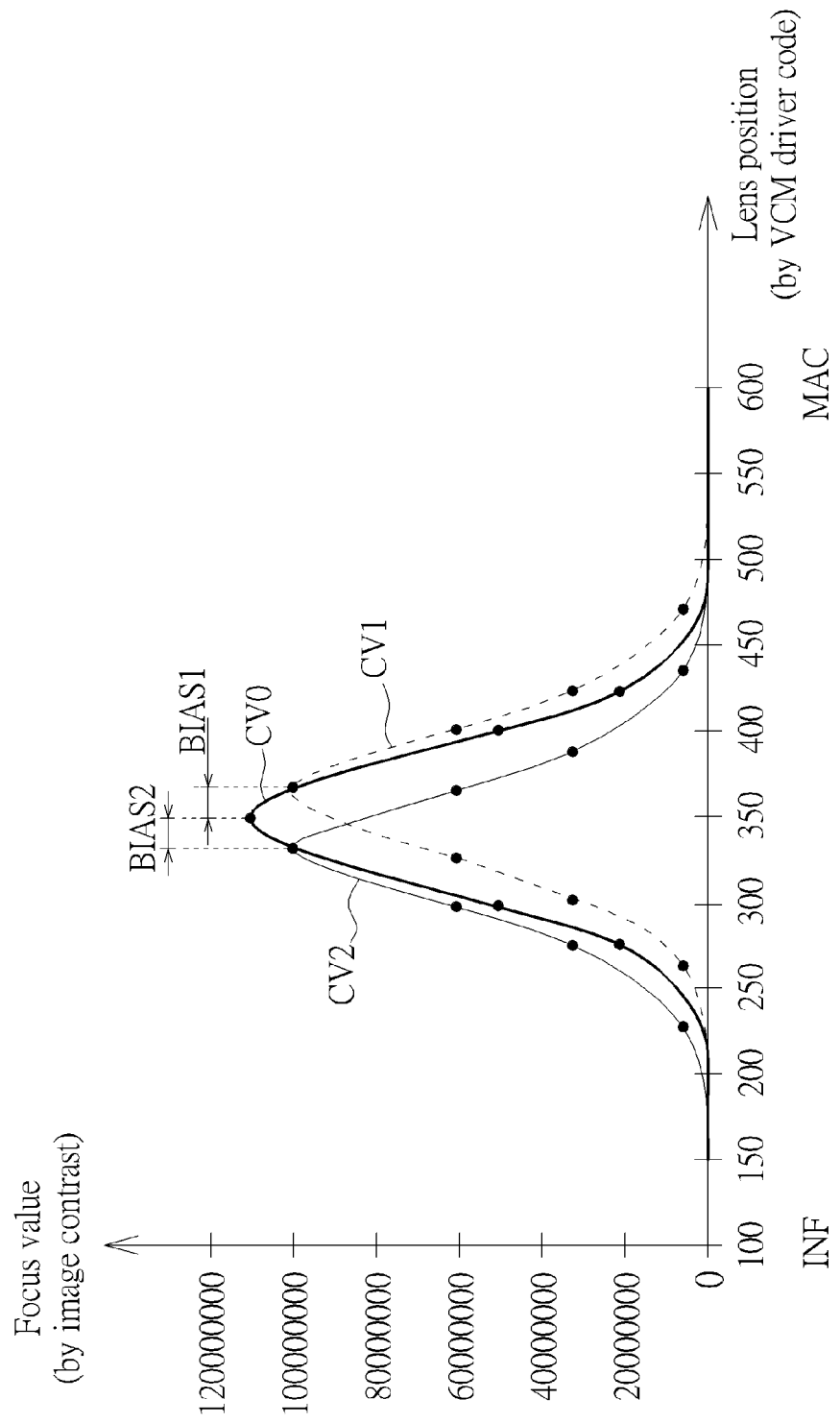
FIG. 2 is a diagram illustrating a relationship between focus values and lens positions without the proposed lens position compensation according to an embodiment of the present invention.

FIG. 2 is a diagram illustrating a relationship between focus values and lens positions without the proposed lens position compensation according to an embodiment of the present invention. The lens position is represented by a VCM driver code, and the focus value is represented by an image contrast value. In a first case where the lens scan direction is from the infinite side (denoted by "INF") to the macro side (denoted by "MAC") and each focus value is derived from analyzing a stable frame (which is captured by the image sensor 104 when the lens 114 becomes stable), the relationship between focus values and lens positions is represented by the characteristic curve CV0. In a second case where the lens scan direction is from the macro side (denoted by "MAC") to the infinite side (denoted by "INF") and each focus value is derived from analyzing a stable frame (which is captured by the image sensor 104 when the lens 114 becomes stable), the relationship between focus values and lens positions is also represented by the characteristic curve CV0. Hence, under the condition that each focus value is derived from analyzing a stable frame, a focused lens position (e.g., VCM_CODE=350) found in a first lens scan direction coincides with a focused lens position (e.g., VCM_CODE=350) found in a second lens scan direction opposite to the first lens scan direction. However, after the lens 114 is moved from a current lens position to a new lens position under the control of the VCM actuator 112, the focus value estimation for the new lens position is not started until the lens becomes stable. For example, the focus value estimation has to wait for the end of damping of the spring mechanism. As a result, the auto-focus speed is degraded.

To avoid the auto-focus speed degradation, each focus value may be derived from analyzing a moving frame that is captured by the image sensor 104 when the lens 114 is still moving due to damping of the spring mechanism 113 (i.e., when the lens 114 is not stable yet). In a third case where the lens scan direction is from the infinite side (denoted by "INF") to the macro side (denoted by "MAC") and each focus value is derived from analyzing a moving frame, the relationship between focus values and lens positions is represented by the characteristic curve CV1. In a fourth case where the lens scan direction is from the macro side (denoted by "MAC") to the infinite side (denoted by "INF") and each focus value is derived from analyzing a moving frame, the relationship between focus values and lens positions is also represented by the characteristic curve CV2. However, under the condition that each focus value is derived from analyzing a moving frame, a focused lens position (e.g., VCM_CODE=375) found in one lens scan direction does not coincide with a focused lens position (e.g., VCM_CODE=325) found in the other lens scan direction. As a result, the auto-focus speed is achieved at the expense of the auto-focus inconsistency.

To combat the auto-focus inconsistency without degrading the auto-focus speed, the present invention proposes a lens position compensation scheme. As shown in FIG. 2, there is a position bias BIAS1 between a focused lens position found in a first lens scan direction (e.g., the lens scan direction from the infinite side to the macro side) on the basis of focus values each derived from analyzing a moving frame and a focused lens position found in the first lens scan direction (e.g., the lens scan direction from the infinite side to the macro side) on the basis of focus values each derived from analyzing a stable frame; and there is a position bias BIAS2 between a focused lens position found in a second lens scan direction (e.g., the lens scan direction from the macro side to the infinite side) on the basis of focus values each derived from analyzing a moving frame and a focused lens position found in the second lens scan direction (e.g., the lens scan direction from the macro side to the infinite side) on the basis of focus values each derived from analyzing a stable frame.

If the focused lens position found in the first lens scan direction (e.g., the lens scan direction from the infinite side to the macro side) on the basis of focus values each derived from analyzing a moving frame can be compensated for the position bias BIAS1, the resultant compensated focused lens position can coincide with the focused lens position found in the first lens scan direction (e.g., the lens scan direction from the infinite side to the macro side) on the basis of focus values each derived from analyzing a stable frame. Similarly, if the focused lens position found in the second lens scan direction (e.g., the lens scan direction from the macro side to the infinite side) on the basis of focus values each derived from analyzing a moving frame can be compensated for the position bias BIAS2, the resultant compensated focused lens position can coincide with the focused lens position found in the second lens scan direction (e.g., the lens scan direction from the macro side to the infinite side) on the basis of focus values each derived from analyzing a stable frame.

Figure 3:
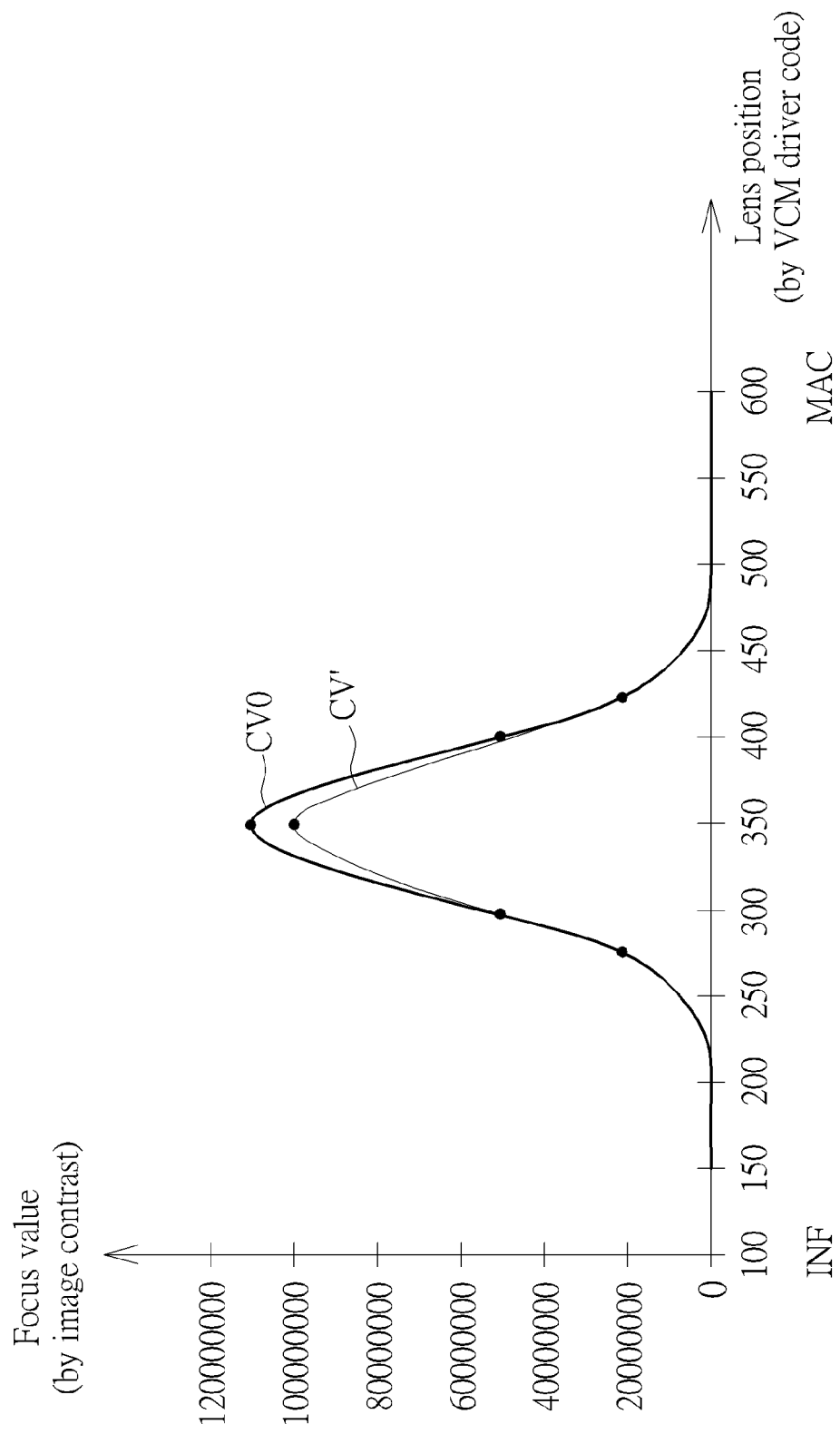
FIG. 3 is a diagram illustrating a relationship between focus values and lens positions with the proposed lens position compensation according to an embodiment of the present invention.

FIG. 3 is a diagram illustrating a relationship between focus values and lens positions with the proposed lens position compensation according to an embodiment of the present invention. The lens position is represented by a VCM driver code, and the focus value is represented by an image contrast value. In a fifth case where the lens scan direction is from the infinite side (denoted by "INF") to the macro side (denoted by "MAC") and each focus value is derived from analyzing a moving frame, the relationship between focus values and compensated focused lens positions is represented by the characteristic curve CV'. In a sixth case where the lens scan direction is from the macro side (denoted by "MAC") to the infinite side (denoted by "INF") and each focus value is derived from analyzing a moving frame, the relationship between focus values and compensated focused lens positions is also represented by the characteristic curve CV'. Under the condition that each focus value is derived from analyzing a moving frame and the proposed lens position compensation is enabled, a compensated focused lens position (e.g., VCM_CODE=350) found in a first lens scan direction coincides with a focused lens position (e.g., VCM_CODE=350) found in a second lens scan direction opposite to the first lens scan direction. As can be seen from FIG. 3, the characteristic curve CV' derived from moving frames is more correct and closer to the characteristic curve CV0 derived from stable frames.

Based on the above observation, the present invention proposes using the lens position compensation circuit 108 shown in FIG. 1 to determine a lens compensation value for each auto-focus procedure. In this embodiment, the storage device 116 is arranged to store a plurality of pre-defined compensation tables $LUT_1$-$LUT_N$ corresponding to a plurality of different environment conditions respectively. The pre-defined compensation tables $LUT_1$-$LUT_N$ are created in a lens position bias calibration phase (e.g., a calibration mode of the camera auto-focus apparatus 100), and then recorded in the storage device 116 for later use in an auto-focus phase (e.g., a normal mode of the camera auto-focus apparatus 100). For example, the lens position bias calibration procedure may be done in the manufacture factory. The different environment conditions may include different exposure settings, such different shutter speeds, different ISO values, etc. Hence, the VCM type lens module 102, the image sensor 104, the lens scan control circuit 106 are controlled to operate in each of the different environment conditions to calibrate a position bias for each of different lens scan settings under the same tested environment condition. In this embodiment, a compensation table is created for each of the different environment conditions tested in the lens position bias calibration phase. In this embodiment, a pre-defined compensation table created for each of the different environment conditions may include a plurality of position compensation values mapped to a plurality of different lens scan settings respectively.

Figure 4:
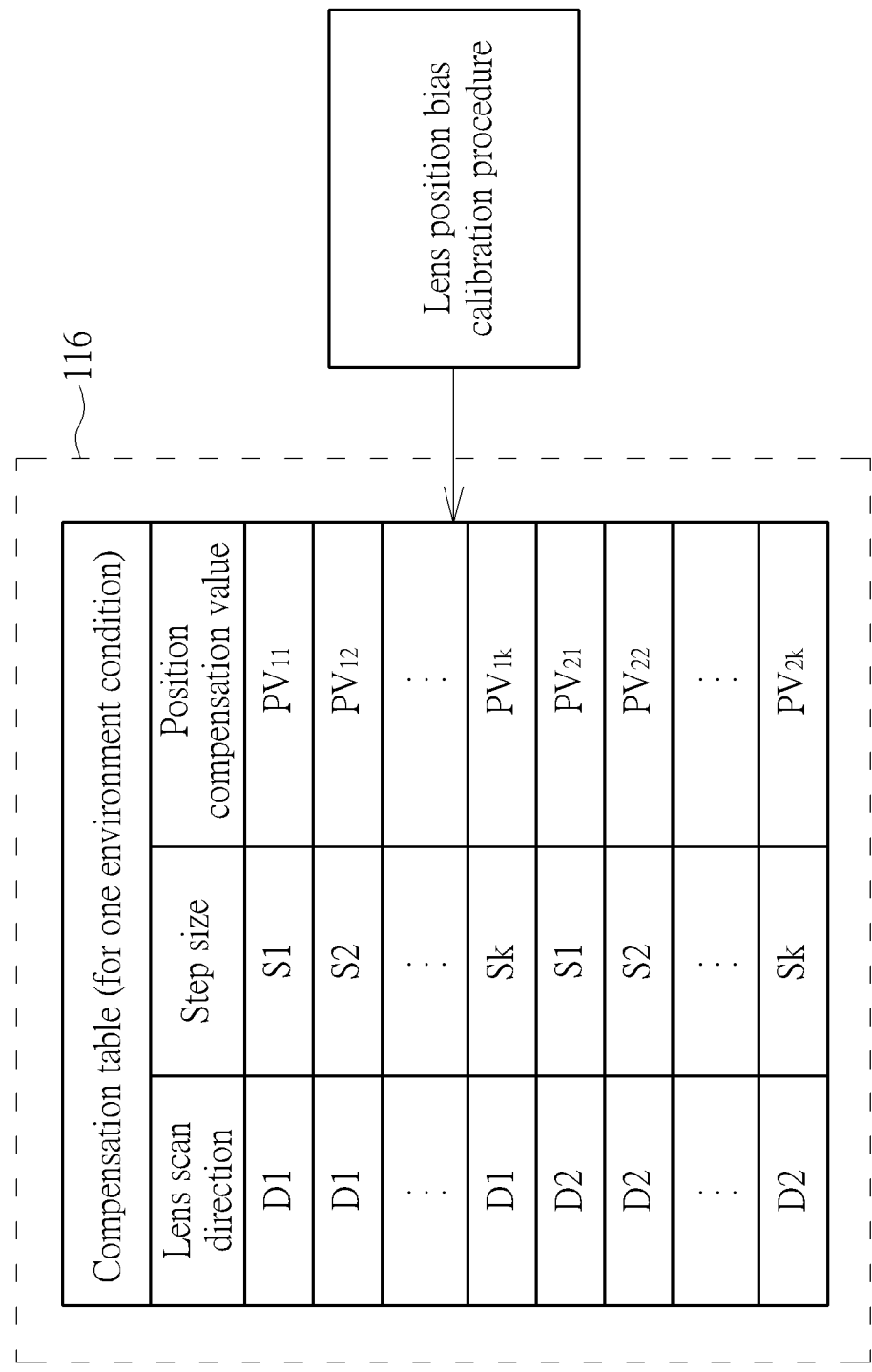
FIG. 4 is a diagram illustrating an example of a compensation table generated from a lens position bias calibration procedure performed under one tested environment condition.

FIG. 4 is a diagram illustrating an example of a compensation table generated from a lens position bias calibration procedure performed under one tested environment condition. Each of the different lens scan settings used under the same tested environment condition may include one or more parameters, such as a lens scan direction and/or a step size. In this example shown in FIG. 4, one lens scan setting is configured to have one lens scan direction and one step size. For example, the lens scan direction may be one of a first lens scan direction D1 (e.g., a lens scan direction from an infinite side to a macro side) and a second lens scan direction D2 (e.g., a lens scan direction from a macro side to an infinite side), where the second lens scan direction D2 is opposite to the first lens scan direction D1. Regarding each of the first lens scan direction D1 and the second lens scan direction D2 selected by the lens position bias calibration procedure performed under the same tested environment condition, the step size may be selected from a plurality of different step size values $S_1$-$S_K$ for position bias calibration. Hence, the lens position bias calibration procedure performed under the same tested environment condition is capable of finding a compensation value for each of the different lens scan settings. For example, the position bias BIAS1 and the position bias BIAS2 shown in FIG. 2 may be identified by the lens position bias calibration procedure, and the corresponding position compensation values for the position bias BIAS1 and the position bias BIAS2 are stored into two table entries of the compensation table.

The table look-up circuit 118 is enabled in the auto-focus phase (e.g., a normal mode of the camera auto-focus apparatus 100). Concerning an auto-focus procedure performed under a current environment condition, the table look-up circuit 118 is arranged to determine a target compensation table from at least a portion (e.g., one or more) of the pre-defined compensation tables $LUT_1$-$LUT_N$ according to the current environment condition, and search the target compensation table for a position compensation value used to compensate a focused lens position for the position bias resulting from the moving frame/damping of the spring mechanism 113.

In a case where the current environment condition exactly matches one of the different environment conditions that are tested in the lens position bias calibration phase, a pre-defined compensation table stored in the storage device 116 is selected as the target compensation table. Assuming that the current environment condition exactly matches the environment condition in which the compensation table shown in FIG. 4 is created, the table look-up circuit 118 selects the compensation table shown in FIG. 4 as the target compensation table. For example, when the lens scan direction is D1 and the step size is S1, the table look-up circuit 118 determines that the position compensation value should be $PV_{11}$. For another example, when the lens scan direction is D2 and the step size is S1, the table look-up circuit 118 determines that the position compensation value should be $PV_{21}$.

In another case where the current environment condition does not match any of the different environment conditions that are tested in the lens position bias calibration phase, an interpolated/extrapolated table derived from one or more of the pre-defined compensation tables $LUT_1$-$LUT_N$ stored in the storage device 116 is used as the target compensation table, where the target compensation table is composed of a plurality of interpolated/extrapolated compensation value mapped to a plurality of different lens scan settings (e.g., different lens scan directions and/or different step sizes).

Figure 5:
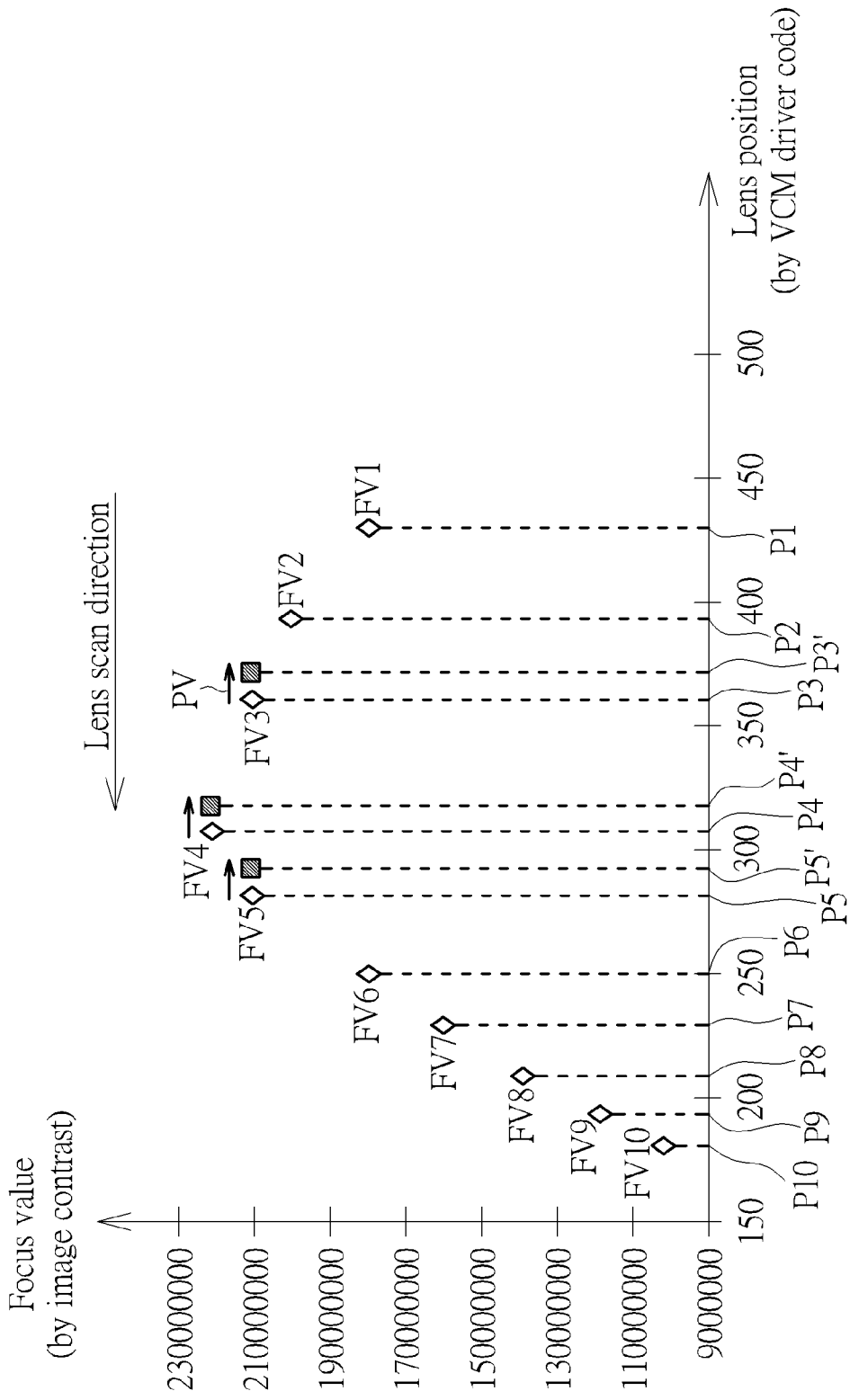
FIG. 5 is a diagram illustrating a lens position compensation operation performed by a lens position decision circuit to determine a focused lens position according to an embodiment of the present invention.

The lens position decision circuit 110 is arranged to determine a focused lens position according to the position compensation value provided by the table look-up circuit 118 and the lens positions and the focus values provided by the lens scan control circuit 106. FIG. 5 is a diagram illustrating a lens position compensation operation performed by the lens position decision circuit 110 to determine a focused lens position according to an embodiment of the present invention. During an auto-focus procedure performed under a current environment condition and a current lens scan setting, the lens scan control circuit 106 controls movement of the lens 114 according to lens positions P1-P10, and obtains focus values FV1-FV10 corresponding to the lens positions P1-P10 respectively. The lens position compensation circuit 108 refers to the current environment condition to determine a target compensation table (which may be a pre-defined compensation table stored in the storage device 116 or an interpolated/extrapolated compensation table derived from pre-defined compensation table(s) stored in the storage device 116) and refer to the current lens scan setting to find a position compensation value PV from the target compensation table.

By way of example, but not limitation, the lens position decision circuit 110 may compensate each of selected lens positions (e.g., P3, P4, and P5) in the lens positions P1-P10 by the position compensation value PV to generate a compensated lens position, and may determine the focused lens position according to compensated lens positions (e.g., P3', P4', and P5') and associated focus values (e.g., FV3, FV4, and FV5) corresponding to the selected lens positions (e.g., P3, P4, and P5). For example, a curve-fitting algorithm is used by the lens position decision circuit 110 to estimate a focus curve on the basis of the compensated lens positions P3', P4', P5' and the associated focus values (e.g., FV3, FV4, and FV5), and then the focused lens position corresponding to a maximum focus value (e.g., a maximum contrast value) of the focus curve is determined by the lens position decision circuit 110.

Figure 6:
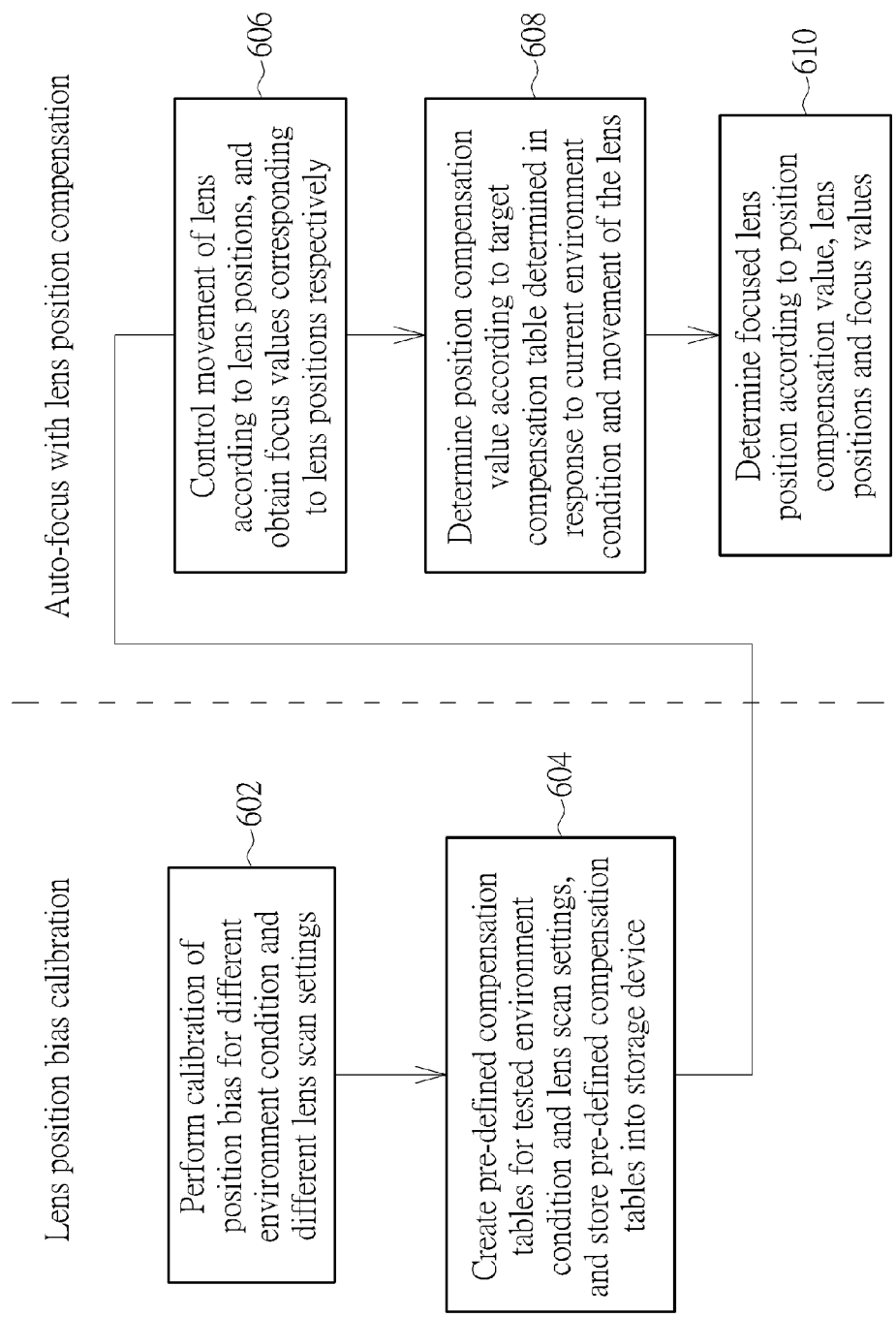
FIG. 6 is a flowchart illustrating a camera auto-focus method according to an embodiment of the present invention.

FIG. 6 is a flowchart illustrating a camera auto-focus method according to an embodiment of the present invention. The auto-focus method includes lens position bias calibration and auto-focus procedure with position compensation. Provided that the result is substantially the same, the steps are not required to be executed in the exact order shown in FIG. 6. The auto-focus method may be briefly summarized as below.

Step 602: Perform calibration of position bias for different environment conditions and different lens scan settings.

Step 604: Create a plurality of pre-defined compensation tables for the tested environment conditions and lens scan settings, and store the pre-defined compensation tables into a storage device.

Step 606: Control movement of a lens according to a plurality of lens positions, and obtain a plurality of focus values corresponding to the lens positions respectively.

Step 608: Determine a position compensation value according to a target compensation table determined in response to a current environment condition and the movement of the lens (i.e., a current lens scan setting). For example, the target compensation table may be one of a plurality of pre-defined compensation tables stored in the storage device. For another example, the target compensation table may be an interpolated/extrapolated table derived from at least a portion (e.g., one or more) of a plurality of pre-defined compensation tables stored in the storage device.

Step 610: Determine a focused lens position according to the position compensation value, the lens positions and the focus values.

Steps 602 and 604 may be performed under the condition that the table look-up circuit 118 is disabled (e.g., the camera auto-focus apparatus 100 is operated under a calibration mode). In addition, one compensation value may be estimated according to the focus values derived from moving frames and stable frames under the same environment condition and the same lens scan setting. Steps 606, 608 and 610 are performed under the condition that the table look-up circuit 118 is enabled (e.g., the camera auto-focus apparatus 100 is operated under a normal mode). Specifically, step 606 may be performed by the lens scan control circuit 106, step 608 may be performed by the lens position compensation circuit 108, and step 610 may be performed by the lens position decision circuit 110. As a person skilled in the art can readily understand details of each step shown in FIG. 6 after reading above paragraphs, further description is omitted here for brevity.

As mentioned above, in the same environment condition and the same step size, the focused lens position determined according to the position compensation value, the lens positions and the focus values obtained for a first lens scan direction (e.g., the lens scan direction from the infinite side to the macro side) is identical to the focused lens position determined according to the position compensation value, the lens positions and the focus values obtained for a second lens scan direction (e.g., the lens scan direction from the macro side to the infinite side) that is opposite to the first lens scan direction. Since the auto-focus inconsistency issue caused by damping of the spring mechanism 113 is solved by the proposed lens position compensation, any of the first lens scan direction and the second lens scan direction can be selected for finding a focused lens position. For example, both of the first lens scan direction and the second lens scan direction may be involved in finding a focused lens position if one of the first lens scan direction and the second lens scan direction that is selected initially fails to find the focused lens position. More specifically, at the time the auto-focus procedure is enabled, the lens scan control circuit 106 is arranged to directly start controlling the movement of the lens 114 in one of the first lens scan direction and the second lens scan direction without controlling the lens 114 to go back to a pre-defined lens home position (e.g., a lens position specified by a smallest VCM driver code or a lens position specified by a largest VCM driver code).

Figure 7:
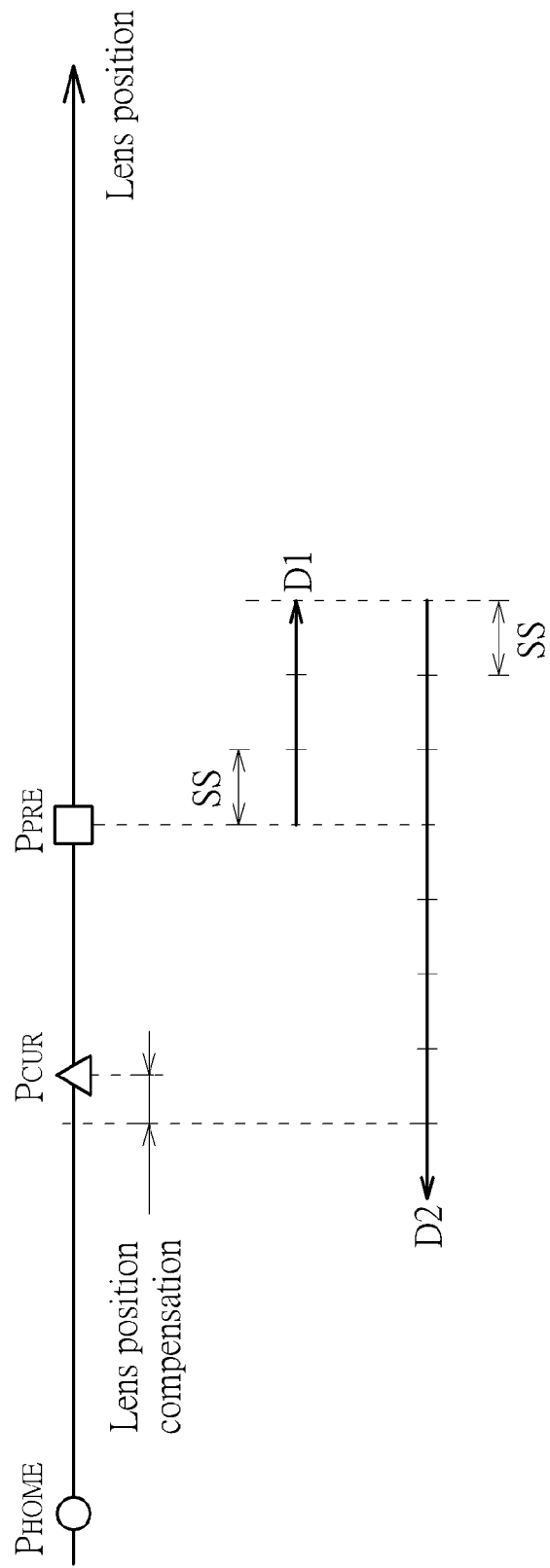
FIG. 7 is a diagram illustrating an auto-focus procedure with a first lens scan direction and a second lens scan direction both involved therein for finding a focused lens position according to an embodiment of the present invention.

FIG. 7 is a diagram illustrating an auto-focus procedure with the first lens scan direction and the second lens scan direction both involved therein for finding a focused lens position according to an embodiment of the present invention. The focused lens position $P_{PRE}$ is obtained from focus values determined by analyzing moving frames during a previous auto-focus procedure. Hence, the lens 114 is located at the focused lens position $P_{PRE}$ when a current auto-focus procedure is started. In other words, the focused lens position $P_{PRE}$ is an initial lens position at the time the current auto-focus procedure is started under a current environment condition. As shown in FIG. 7, the correct focused lens position is $P_{CUR}$. In a first case where an initial guess of the lens scan direction is the first lens scan direction D1. Hence, as shown in FIG. 7, the lens scan control circuit 106 controls the VCM actuator 112 to move the lens 114 away from the correct focused lens position $P_{CUR}$ according to a step size SS in the first lens scan direction D1. It should be noted that, at the time the current auto-focus procedure is enabled, the lens scan control circuit 106 directly starts controlling the movement of the lens 114 in the first lens scan direction D1 without controlling the lens 114 to go back to a pre-defined lens home position $P_{HOME}$. When determining that no maximum focus value can be found in the first lens scan direction D1 according to focus values determined by analyzing moving frames, the lens scan control circuit 106 decides that a focused lens position cannot be found in the first lens scan direction D1. Hence, the lens scan control circuit 106 selects the second lens scan direction D2 instead, where the second lens scan direction D2 is opposite to the first lens scan direction D1. As shown in FIG. 7, the lens scan control circuit 106 controls the VCM actuator 112 to move the lens 114 toward the correct focused lens position $P_{CUR}$ according to the same step size SS in the second lens scan direction D2. The lens position decision circuit 110 determines the correct focused lens position $P_{CUR}$ according to focus values derived from analyzing moving frames captured at lens positions in the second lens scan direction D2 and a lens position compensation value determined by the proposed lens position compensation scheme.

In a second case where an initial guess of the lens scan direction is the second lens scan direction D2. Hence, as shown in FIG. 7, the lens scan control circuit 106 controls the VCM actuator 112 to move the lens 114 towards the correct focused lens position $P_{CUR}$ according to the step size SS in the second lens scan direction D2. The lens position decision circuit 110 determines the correct focused lens position $P_{CUR}$ according to focus values derived from analyzing moving frames captured at lens positions in the second lens scan direction D2 and a lens position compensation value determined by the proposed lens position compensation scheme.

The step size SS of the movement of the lens 114 in the first lens scan direction D1 is equal to the step size SS of the movement of the lens 114 in the second lens scan direction D2. Hence, during the auto-focus procedure, the image content in an AF frame which encompasses a target object displayed in a user interface (e.g., a display screen of an electronic device using the camera auto-focus apparatus 100) has a constant zoom-in/zoom-out rate. More specifically, during the auto-focus procedure, the size of the target object included in successive preview images displayed in the user interface has a constant zoom-in/zoom-out rate.

Figure 8:
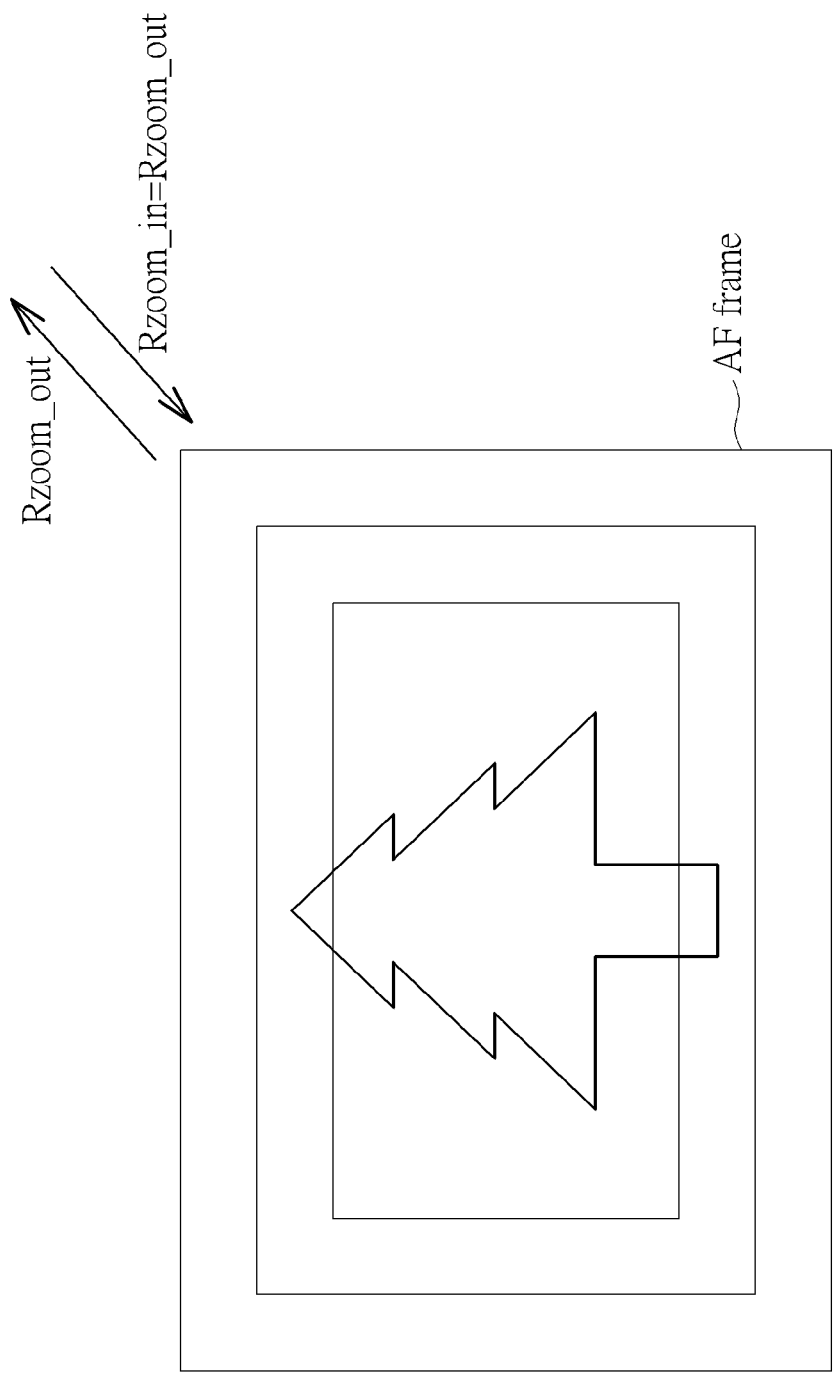
FIG. 8 is a diagram illustrating an example of an auto-focus frame with an image content dynamically zoomed in/zoomed out during an auto-focus procedure.

FIG. 8 is a diagram illustrating an example of an AF frame with an image content dynamically zoomed in/zoomed out during an auto-focus procedure. Since the proposed lens position compensation enables the lens 114 to have the same step size in opposite lens scan directions, the zoom-in rate Rzoom_in of an image content included in the AF frame can be the same as the zoom-out rate Rzoom_out of the image content included in the AF frame. Hence, when the lens 104 is controlled to move in a first lens scan direction, the image content included in the AF frame displayed on a user interface has the zoom-in rate Rzoom_in; and when the lens 104 is controlled to move in a second lens scan direction opposite to the first lens scan direction, the image content included in the AF frame displayed on the user interface has the zoom-out rate Rzoom_out, where Rzoom_out=Rzoom_in.

Further, under the same environment condition and the same step size, a focused lens position determined according to the lens position compensation and the focus values derived from moving frames in the first lens scan direction D1 is identical to a focused lens position determined according to the lens position compensation and the focus values derived from moving frames in the second lens scan direction D2. Hence, when one of the first lens scan direction D1 and the second lens scan direction D2 fails to find a focused lens position, the other of the first lens scan direction D1 and the second lens scan direction D2 can be used to find a focused lens position. The auto-focus speed is ensured without degradation of the focused lens position accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera auto-focus method comprising:
   during an auto-focus procedure:
   controlling movement of a lens according to a plurality of first lens positions in a first lens scan direction, and when a focused lens position is not found in the first lens scan direction, controlling the movement of the lens according to a plurality of second lens positions in a second lens scan direction and obtain a plurality of focus values corresponding to the second lens positions respectively, wherein the second lens scan direction is opposite to the first lens scan direction, and each step size of the movement of the lens in the first lens scan direction is equal to each corresponding step size of the movement of the lens in the second lens scan direction; and determining a focused lens position according to at least the second lens positions and the focus values.

2. The camera auto-focus method of claim 1, further comprising:

determining a position compensation value according to the movement of the lens in the second lens scan direction;

wherein determining the focused lens position comprises:

determining the focused lens position according to the position compensation value, the second lens positions and the focus values.

3. The camera auto-focus method of claim 1, wherein at the time the auto-focus procedure is enabled, controlling the movement of the lens in the first lens scan direction is directly started without controlling the lens to go back to a pre-defined lens home position.

* * * * *